United States Patent [19]
Shigeura

[11] Patent Number: 5,911,630
[45] Date of Patent: Jun. 15, 1999

[54] FLEXIBLE GEAR COUPLING

[75] Inventor: Junichi Shigeura, Tokyo, Japan

[73] Assignee: Mitsubishi Denki Kabushiki Kaisha, Tokyo, Japan

[21] Appl. No.: 08/857,502

[22] Filed: May 16, 1997

[30] Foreign Application Priority Data

Oct. 31, 1996 [JP] Japan .................................. 8-289985

[51] Int. Cl.$^6$ .................................................. F16D 3/18
[52] U.S. Cl. ........................ 464/154; 277/403; 464/158
[58] Field of Search .................... 464/153, 154, 464/147, 106, 157, 158, 159; 277/403, 366

[56] References Cited

U.S. PATENT DOCUMENTS

| | | |
|---|---|---|
| 1,747,529 | 2/1930 | Place . |
| 1,770,744 | 7/1930 | Morgan .................................. 464/154 |
| 2,842,945 | 7/1958 | Swanson ................................ 464/154 |
| 3,425,239 | 2/1969 | Baier ..................................... 464/158 |
| 3,502,343 | 3/1970 | Pustelnik ............................... 277/403 |
| 3,613,395 | 5/1970 | Shigeura ................................ 464/154 |
| 3,712,080 | 1/1973 | Shigeura ................................ 464/154 |
| 4,923,377 | 5/1990 | Cavalleri ............................... 277/403 |
| 5,232,292 | 8/1993 | Stackling et al. ...................... 277/403 |

FOREIGN PATENT DOCUMENTS

| | | |
|---|---|---|
| 0 117 392 | 9/1984 | European Pat. Off. . |
| 0 349 180 | 1/1990 | European Pat. Off. . |
| 72810 | 7/1951 | Germany ............................... 464/154 |
| 1 142 473 | 1/1963 | Germany . |
| 2 602 793 | 7/1976 | Germany . |
| 4 412 132 | 10/1995 | Germany . |
| 35-13707 | 6/1960 | Japan . |
| 129128 | 6/1991 | Japan ..................................... 464/154 |
| 588410 | 1/1978 | U.S.S.R. ................................ 464/154 |
| 795225 | 5/1958 | United Kingdom ................... 464/154 |
| 815693 | 7/1959 | United Kingdom ................... 464/154 |
| WO95/27151 | 10/1995 | WIPO . |

*Primary Examiner*—Eileen Dunn Lillis
*Attorney, Agent, or Firm*—Burns, Doane, Swecker & Mathis, L.L.P.

[57] ABSTRACT

The flexible gear coupling comprises a seal member 14 axially slidably disposed on the outer circumference surface of the connection portion 13b of the pinion 13, the each opposite end of the seal member 14 having a spherical seal surface 14a of the predetermined radius r having its center at the position A at which the central axis A1 of the width of the outer teeth gear 13a of the pinion 13 crosses the axis A2 and abutting with an abutting surface 15a of the end cover 15 and a spring member 17 disposed on the outer circumference side of the connection portion 13b of the pinion 13 for urging the seal member 14 against the abutting surface 15a of the end cover 15 at the predetermined force.

6 Claims, 4 Drawing Sheets

FLEXIBLE GEAR COUPLING

BACKGROUND OF THE INVENTION

This invention relates to a flexible gear coupling for connecting a drive electric motor and a speed reduction gear unit of a railway vehicle.

In a railway vehicle, the drive motor is mounted to a bogie frame and the speed reduction gear unit is mounted to an axle. Therefore, axes of the output shaft of the drive electric motor and the pinion shaft of the speed reduction gear unit come out of alignment due to shaking of the travelling vehicle, generating a flexure in the shafts. The flexible gear coupling is connected between the drive electric motor and the speed reduction gear unit so that the smooth power transmission can be achieved between these shafts even when the shafts are out of alignment as discussed above.

FIG. 5 is a front view showing in partial section a part of structure of the conventional flexible gear coupling described in Japanese Utility Model Publication No. 35-13707 for example, FIG. 6 is a sectional view showing the structure of the main portion of the flexible gear coupling shown in FIG. 5, FIG. 7 is a sectional view showing the state in which the axis of the rotating shaft shown in FIG. 6 is displaced in the perpendicular direction with respect to the axis of the sleeve and a flexure is generated, and FIG. 8 is a sectional view showing the state in which a larger flexure is generated as compared to the state shown in FIG. 7.

In the figures, the reference numerals 1 are rotary shafts, one of them being an output shaft of a drive electric motor for example and the other being an input shaft to a speed reduction gear unit. 2 are sleeves fastened together by bolts or the like into a unitary structure, each having an inner teeth gear 2a formed in an end portion inner circumferential surface. 3 is a pair of pinions each secured at its inner circumference side to the respective rotary shaft 1 and having on an outer circumference side an outer teeth gear 3a to which the crowning is applied for engaging with the inner teeth gear 2a of the sleeves 2 and having in an outer side surface a recessed portion 3b open toward the outside. Grease (not shown) is filled into the space in which the inner teeth gear 2a of the sleeve 2 and the outer teeth gear 3a engage with each other. 4 are end covers, each having one end secured to the sleeve 2 and the other end disposed at a position within the recessed portion 3b of the pinion 3 with a predetermined clearance therebetween for preventing the grease within the sleeve 2 from scattering out and for preventing the ingress of dust particles. 5 are annular elastic seal members secured to the rotary shaft 1 and urged against the other side of the end cover 4 for preventing any dust particles from entering through the gap between the pinion 3 and the end cover 4.

In the conventional flexible gear coupling having a structure as above described, even when the vehicle body shakes during travelling and the axes of the output shaft of the driving electric motor and the input shaft of the speed reduction gear unit come out of alignment, since the outer teeth gear 3a of the pinion 3 is crowned, the transmission of the driving force from on rotary shaft 1 to the other rotary shaft 1 is smoothly achieved and, even when both of the rotary shafts 1 shift in the axial direction, the outer teeth gear 3a of the pinion 3 freely move along the grooves of the inner teeth gear 2a of the sleeve 2. Further, in the state in which both of the rotary shafts 1 are aligned on a common axis, the seal member 5 is urged at a predetermined pressure against the other end of the end cover 4 over the entire circumference thereof thereby establishing a good seal.

Since the conventional flexible gear coupling has a structure as above-described, the seal member 5 experiences an excessive deformation as shown in FIG. 7 when a flexure is generated, posing a problem that the seal member is easily worn and damaged. Also, when the flexure further progresses, a gap 6 generates between the end cover 4 and the seal member 5 as shown in FIG. 8, making the ingress of dust particles easier. Further, since the rotational speed of the driving electric motor is very high and may be 6,000 rpm for example, the life of the seal member is shortened by wearing and the sealing may be damaged by the centrifugal force.

SUMMARY OF THE INVENTION

Accordingly, the present invention has been made in order to solve the above-discussed problems and has as its object the provision of a flexible gear coupling in which the satisfactory seal can be maintained even when the axes are displaced and in which the resistance to wear is good and has a long life.

With the above object in view, the flexible gear coupling according to one embodiment of the present invention includes a sleeve having inner teeth formed at each end portion of an inner circumferential surface thereof, and a pair of pinions. Each pinion is disposed within the sleeve and has, formed in its outer circumference, outer teeth and has formed, in its inner circumference, a cylindrical connection portion for being connected to a rotary shaft. The outer teeth gear being engageable with one of the inner teeth and is movable by a predetermined distance in the direction of axis of the inner teeth and crowned to be allowed to tilt by a predetermined angle with respect to the central axis of the inner teeth. The gear coupling further includes a pair of annular seal members, each disposed on the outer circumference of the connection portion of the pinion. The seal member is slidable in the direction of the central axis of the pinion and has on each opposite side thereof a spherical seal surface having a predetermined radius of curvature having a center at a crossing point of a center line of width of the outer teeth gear and the central axis of the pinion, a pair of end covers secured at their outer circumference to the opposite ends of the sleeve and having on their inner circumference an abutting surface intimately abutting against the seal surface of the seal member, and a spring member disposed on the outer circumference of the connection portion of the pinion and biasing the seal member in the opposite direction by a predetermined force to urge the seal surface of the seal member against the abutting surface of the end cover.

According to the flexible gear coupling of one embodiment of the present invention the seal member of is made of the same material as that of the pinion.

According to the flexible gear coupling one embodiment of the present invention the seal surface of the seal member is coated with a lubricating member.

According to the flexible gear coupling one embodiment of the present invention the seal surface of the seal member is coated with a mixture of molybdenum disulfide and a thermo-setting resin applied by burning.

According to the flexible gear coupling of one embodiment of the present invention the seal member has embedded therein a ring-shaped shape retaining member having a mechanical strength higher than that of the seal member.

According to the flexible gear coupling of one embodiment of the present invention the shape retaining member has, on its side opposing to the spring member, a seat portion projecting from a side surface of the seal member and abutting with one end portion of the spring member.

According to the flexible gear coupling of one embodiment of the present invention the shape retaining member has, on its side opposing to the spring member, a restriction portion projecting from a side surface of the seal member and surrounding one end of the spring member.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENTS

Figure 1:
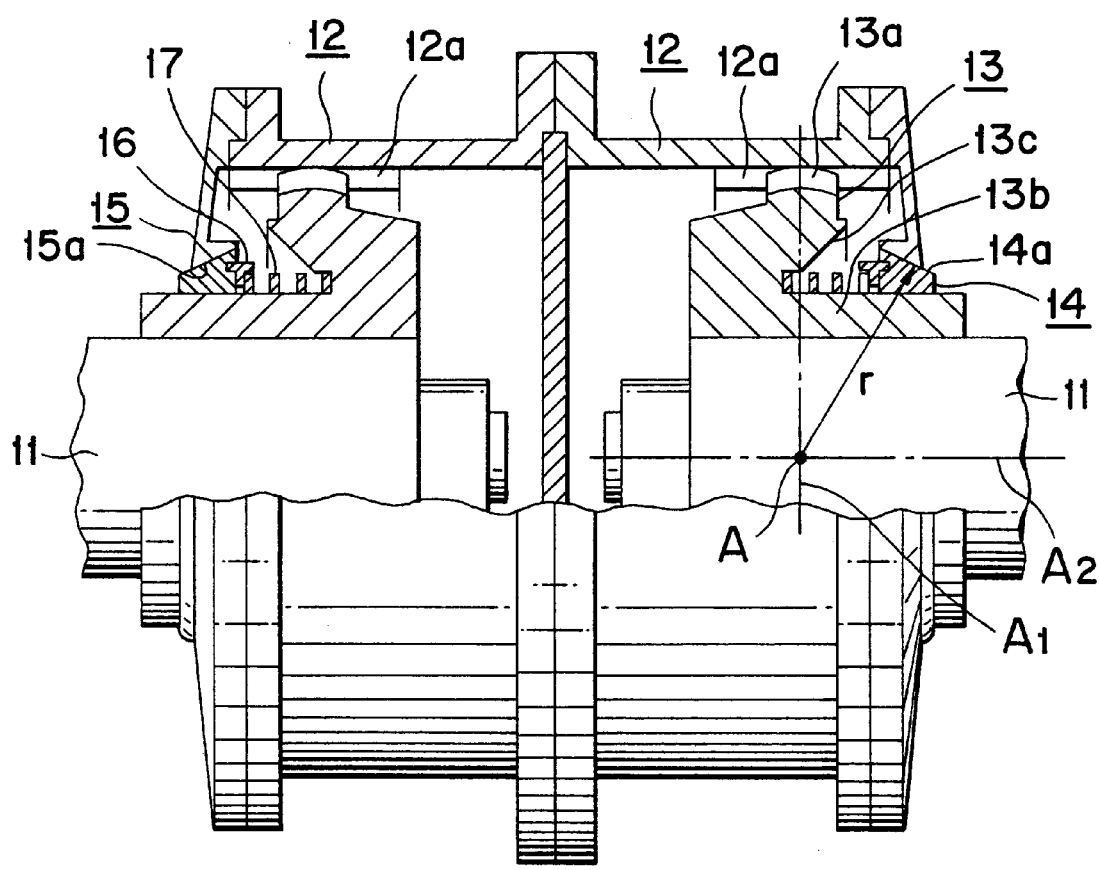
FIG. 1 is a front view showing in partial section a part of structure of a flexible gear coupling of first embodiment of the present invention.
Figure 2:
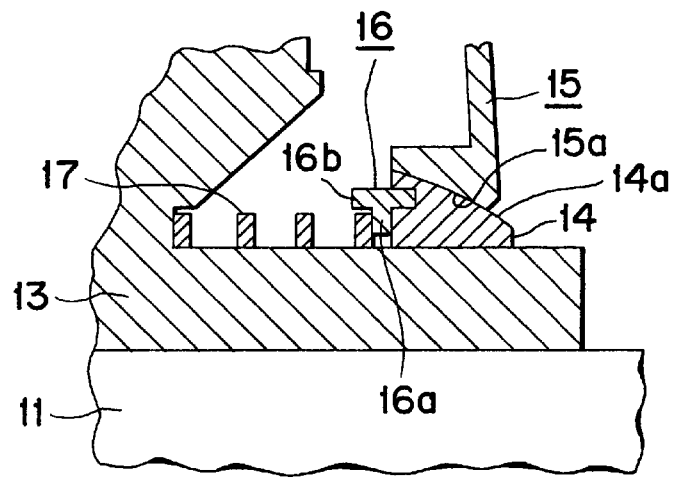
FIG. 2 is a sectional view showing the structure of the main portion of the flexible gear coupling shown in FIG. 1.
Figure 3:
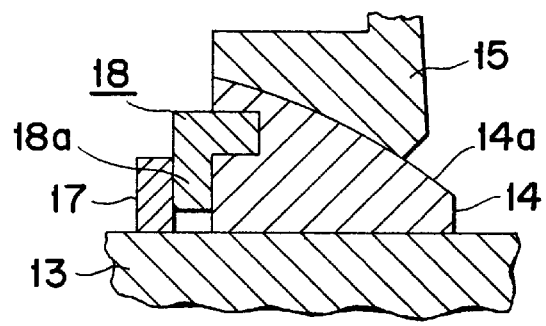
FIG. 3 is a sectional view showing the example of the deformation of the shape retaining member shown in FIG. 2.
Figure 4:
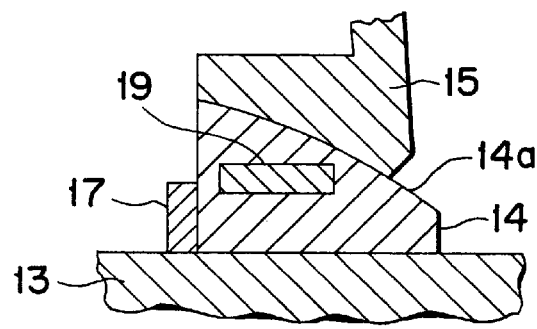
FIG. 4 is a sectional view showing another example of the deformation of the shape retaining member other than that shown in FIG. 3.
Figure 5:
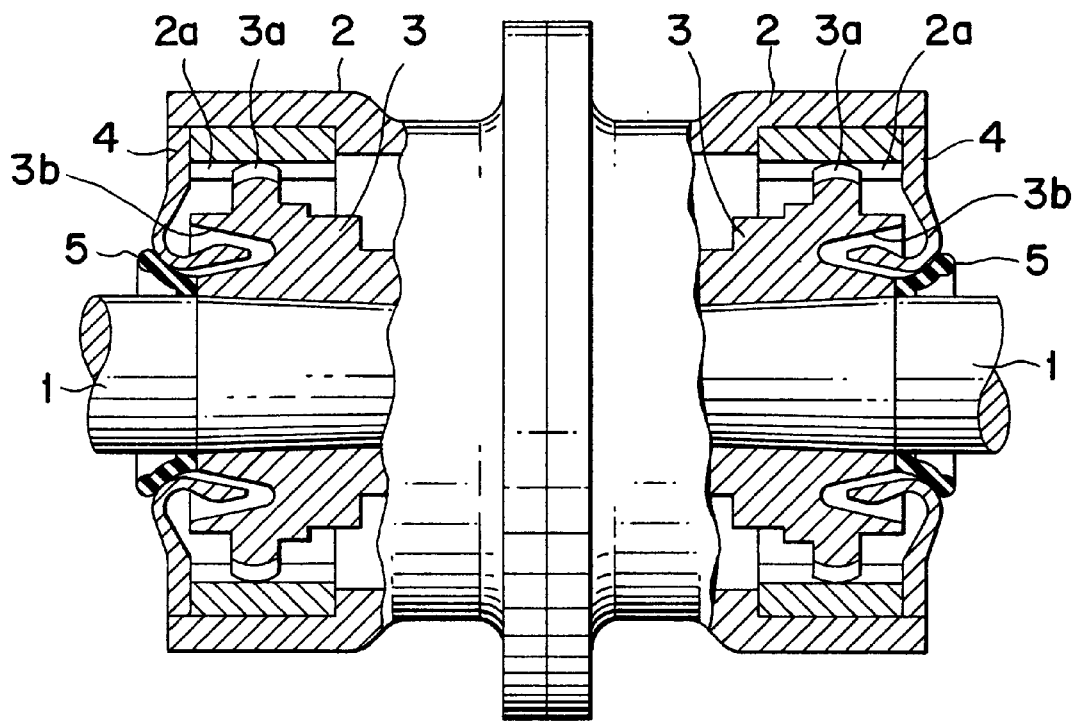
FIG. 5 is a front view showing in partial section a part of structure of the conventional flexible gear coupling.
Figure 6:
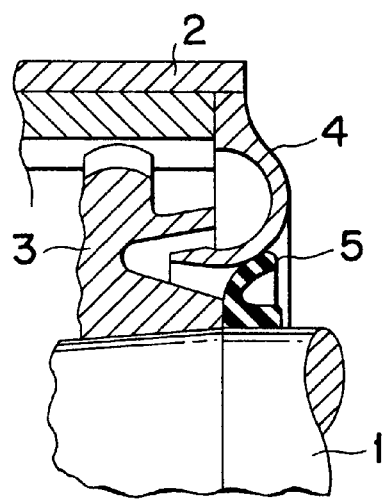
FIG. 6 is a sectional view showing the structure of the main portion of the flexible gear coupling shown in FIG. 5.
Figure 7:
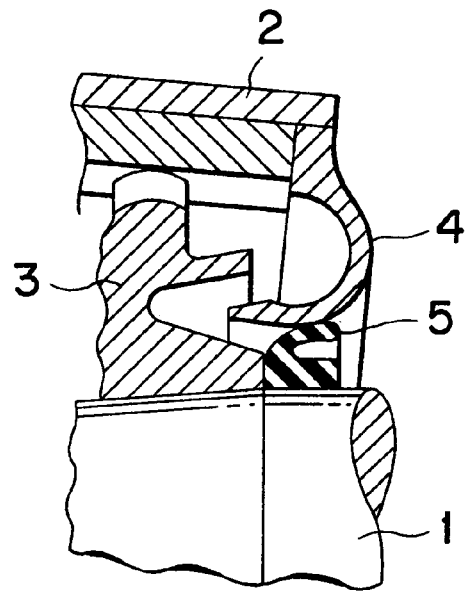
FIG. 7 is a sectional view showing the state in which the axis of the rotating shaft shown in FIG. 6 is displaced in the perpendicular direction with respect to the axis of the sleeve and a flexure is generated.
Figure 8:
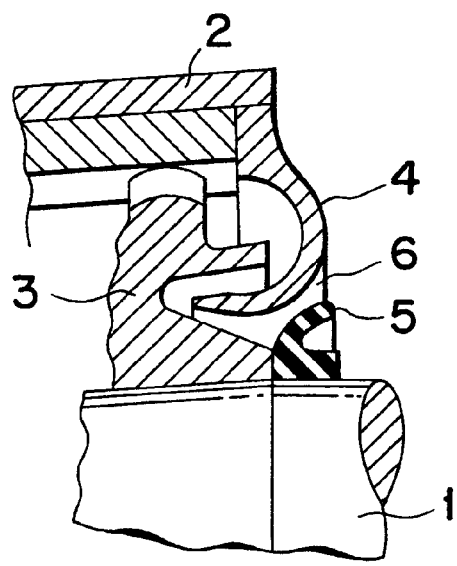
FIG. 8 is a sectional view showing the state in which a larger flexure is generated as compared to the state shown in FIG. 7.

FIG. 1 is a front view showing in partial section a part of the structure of a flexible gear coupling of a first embodiment of the present invention, FIG. 2 is a sectional view showing the structure of the main portion of the flexible gear coupling shown in FIG. 1, FIG. 3 is a sectional view showing the example of the deformation of the shape retaining member shown in FIG. 2 and FIG. 4 is a sectional view showing another example of the deformation of the shape retaining member other than that shown in FIG. 3.

In the figures, the reference numerals 11 are rotary shafts, one of them being an output shaft of a drive electric motor for example and the other being an input shaft to a speed reduction gear unit. 12 are sleeves fastened together by bolts or the like into a unitary structure, each having inner teeth 12a formed in an end portion inner circumferential surface. 13 is a pair of pinions each secured at its inner circumference side to the respective rotary shaft 11 and having on outer circumference side an outer teeth 13a to which the crowning is applied for engaging with the inner teeth 12a of the sleeves 12 and having on an inner circumference side a connection portion 13b connected to the rotary shaft 1 by fitting engagement and having at a position at which the outer circumference surface of the connection portion 13b and the side surface of the outer teeth 13a intersect a recessed portion 13c open toward outside, the pinion 13 being opposingly provided within the sleeve 13.

The reference numeral 14 is a pair of annular seal members axially slidably disposed on the outer circumference of the connection portion 13b of each pinion 13. The seal members 14 each have formed therein a spherical seal surface 14a having a predetermined radius of curvature r having a center at a crossing point of a center line $A_1$ of width of said outer teeth gear and the central axis $A_2$ of the outer teeth 13a of the pinion 13. 15 is a pair of end covers secured at their outer circumference side to the end face of the sleeve 12 and each having on the inner circumference side an abutting surface 15a which can intimately abut against the seal surface 14a of one of the seal members 14.

The reference numeral 16 is a shape retaining member formed into a ring-shape of a substantially T-shaped cross section and having a mechanical strength larger than that of the seal member 14, the shape retaining member 16 being embedded within the seal member 14. The shape retaining member 16 has a seat portion 16a projecting from a side surface of the seal member 14 to the side facing to the recessed portion 13c of the pinion 13 to extend in the direction crossing the above-described axis A2 to abut against one end portion of the spring member which will be described later, and a restriction portion 16b extending in concentric with the axis A2 to surround one end portion of the spring member. 17 is the spring member engaged with the outer circumference surface of the connection portion 13b of the pinion 13, one end thereof being brought into abutment with the seat portion 16a of the shape retaining member 16 and the other end thereof being engaged with the bottom of the recessed portion 13c of the pinion 13 in order that the seal surface 14a of the seal member 14 may be urged against the abutting surface of the end cover 15 at a predetermined force.

In the flexible gear coupling of the first embodiment having the above-described construction, even when the vehicle body shakes during travelling and the axes of the output shaft of the driving electric motor and the input shaft of the speed reduction gear unit come out of alignment, since the outer teeth 13a of the pinion 13 is crowned as in the conventional design, the transmission of the driving force from on rotary shaft 11 to the other rotary shaft 11 is smoothly achieved and, even when both of the rotary shafts 11 shift in the axial direction, the outer teeth 13a of the pinion 13 freely moves along the grooves of the inner teeth gear 12a of the sleeve 12. Further, the seal member 14 is urged by the spring member 17 at a predetermined pressure against the other end of the end cover 15, the seal surface 14a abuts against the abutting surface 15a of the end cover 15 thereby establishing a good seal therebetween.

Thus, according to the first embodiment of the present invention, the seal member 14 is axially slidably disposed on the outer circumference surface of the connection portion 13b of the pinion 13, and each opposite end of the seal member 14 has a spherical seal surface 14a of the predetermined radius r having its center at the position A at which the central axis A1 of the width of the outer teeth 13a of the pinion 13 crosses the axis A2. This seal surface 14a is urged by the spring member 17 against the abutting surface 15a of the end cover 15 at the predetermined force, so that the seal member 14 is not deformed even when the flexure increases and the relationship between the seal surface 14a and the abutting surface 15a of the end cover 15 is always kept the same for maintaining a sufficient seal therebetween.

Also, since the seal member 14 has a above-described construction, it may be made of a sintered alloy or a non-metal material such as ceramics and carbon when the pinion 13 is made of a carbon steel, so that a sufficient wear resistance can be obtained to provide a long life, Further, since the shape retaining member 16 is embedded within the seal member 14, the mechanical strength of the seal member 14 is increased and the deformation of the seal member 14 due to the centrifugal force is prevented, and since the end surface of the seal member 14 is received by the seat portion 16a, the seal member 14 is prevented from being damaged by the spring member 17, and since the one end portion side of the spring member 17 is surrounded by the restriction portion 16b, the spring member 17 is not prevented from jumping out by the centrifugal force.

When the seal member 14 is formed by the same material as that of the pinion 13, it is possible to prevent the obstruction of the smooth sliding movement of the seal member 14 relative to the connection portion 13b of the pinion 13 because of the improper fitting between them due to the thermal expansion and contraction differences and, when the seal surface 14a of the seal mixture 14 is coated with a lubricating member such as the heat-applied mixture of molybdenum disulfide and a thermosetting resin, a smoother sliding movement can be obtained to improve the function of the seal member 14.

Further, while the shape retaining member 16 embedded within the seal member 14 according to the constructions shown in FIGS. 1 and 2 has the cross sectional shape of T including the seat portion 16a and the restriction portion 16b, a shape retaining member 18 of a cross sectional shape of the substantially inverted L having only a seat portion 18a as illustrated in FIG. 3 may also be used to prevent the deformation of the seal member 14 and the damages to the end surface of the seal member 14 by the spring member 17. Also, a shape retaining member 19 having a substantially rectangular cross-sectional shape as shown in FIG. 4 may be used to prevent the deformation of the seal member 14.

As has been described, according to the present invention, the flexible gear coupling comprises a sleeve having inner teeth formed at each end portion of an inner circumferential surface thereof, a pair of pinions each disposed within the sleeve and having formed in its outer circumference outer teeth and having formed in its inner circumference a cylindrical connection portion for being connected to a rotary shaft, the outer teeth being engageable with one of the inner teeth gear, movable by a predetermined distance in the direction of axis of the inner teeth and crowned to be allowed to tilt by a predetermined angle with respect to the central axis of the inner teeth, a pair of annular seal members each disposed on the outer circumference of the connection portion of the pinion, each seal member being slidable in the direction of the central axis of the pinion and having on each opposite side thereof a spherical seal surface having a predetermined radius of curvature having a center at a crossing point of a center line of width of the outer teeth and the central axis of the pinion, a pair of end covers, each end cover secured at its outer circumference to the opposite ends of the sleeve and having on its inner circumference an abutting surface intimately abutting against the seal surface of the seal member, and a spring member disposed on the outer circumference of the connection portion of the pinions and biasing the seal members in the opposite direction by a predetermined force to urge the seal surface of the seal members against the abutting surface of the end covers, so that the flexible gear coupling maintains a sufficient seal even when the axes come out of alignment and is good in wear resistance and has a long operating life.

According to the present invention in the flexible gear coupling, the seal members are made of the same material as that of the pinions, so that a flexible gear coupling may be obtained, which not only maintains a sufficient seal even when the axes come out of alignment and which is good in wear resistance and has a long operating life, but also allows a good fitting engagement between the seal member and connection portion of the pinion.

According to the present invention, the flexible gear coupling further comprises a lubricating member coating the seal surface of the seal member, so that a flexible gear coupling in which the sliding movement of the seal member is smooth and the sealing performance may be improved can be obtained.

According to the present invention in the flexible gear coupling the seal surface of the seal members is coated with a mixture of molybdenum disulfide and a thermsetting resin applied by burning, so that a flexible gear coupling in which the sliding movement of the seal member is smooth and the sealing performance may be improved can be obtained.

According to the present invention in the flexible gear coupling, each seal member has embedded therein a ring-shaped shape retaining member having a mechanical strength higher than that of the seal member, so that a flexible gear coupling can be obtained in which a sufficient seal can be maintained even when the axes come out of alignment and which is not only good in wear resistance and has a long operating life, but also the deformation of the seal member can be prevented.

According to the present invention, in the flexible gear coupling, the shape retaining member has, on its side opposing to the spring member, a seat portion projecting from a side surface of the seal members and abutting with one end portion of the spring member, so that a flexible gear coupling in which the spring members is prevented form damaging the side surface of the seal member.

According to the present invention, in the flexible gear coupling, the shape retaining member has, on its side opposing to the spring member, a restriction portion projecting from a side surface of the seal member and surrounding one end of the spring members, so that a flexible gear coupling in which the spring member is prevented from jumping out by the centrifugal force.

What is claimed is:

1. A flexible gear coupling comprising:

a sleeve having inner teeth formed at each end portion of an inner circumferential surface thereof;

a pair of pinions, each pinion disposed within said sleeve and having outer teeth formed in an outer circumference and a cylindrical connection portion formed in an inner circumference for being connected to a rotary shaft, said outer teeth being engageable with one of said inner teeth, movable by a predetermined distance in the direction of axis of said inner teeth and crowned to be allowed to tilt by a predetermined angle with respect to the central axis of said inner teeth;

a pair of annular seal members each disposed on an outer circumference of said connection portion of said pinion, said seal members being slidable in the direction of the central axis of said pinion and having on each opposite side thereof a spherical seal surface having a predetermined radius of curvature having a center at a crossing point of a center line of width of said outer teeth and the central axis of said pinions;

a pair of end covers, each end cover secured at an outer circumference to the opposite ends of said sleeve and having an abutting surface on an inner circumference intimately abutting against said seal surface of one of said seal members; and a spring member disposed on the outer circumference of said connection portion of said pinions and biasing said seal members by a predetermined force to urge said seal surface of said seal members against said abutting surface of said end covers, wherein each of said seal members has embedded therein a ring-shaped retaining member having a mechanical strength higher than that of said seal members, and a seat portion projecting into a respective seal member wherein said retaining member is disposed so as to abut with one end portion of said spring member.

2. A flexible gear coupling as claimed in claim 1, wherein said seal members are made of the same material as that of said pinions.

3. A flexible gear coupling as claimed in claim 1, wherein said seal surface of each of said seal members has a coating of a lubricating mixture.

4. A flexible gear coupling as claimed in claim 3, wherein said lubricating mixture is a mixture of molybdenum disulfide and a thermo-setting resin applied by burning.

5. A flexible gear coupling as claimed in claim 1, wherein each of said shape retaining members have, on a side opposing to said spring member, a seat portion projecting from a side surface of said seal members and abutting with said one end portion of said spring member.

6. A flexible gear coupling as claimed in claim 1, wherein each of said shape retaining members has, on a side opposite to a respective said seal member, a restriction portion projecting from a side surface of said seal member and surrounding one end of said spring member.

* * * * *